US010153669B2

United States Patent
Im

(10) Patent No.: US 10,153,669 B2
(45) Date of Patent: Dec. 11, 2018

(54) DEVICE FOR PREVENTING VIBRATION OF STATOR CORE FOR POWER GENERATOR

(71) Applicant: DOOSAN HEAVY INDUSTRIES & CONSTRUCTION CO., LTD., Changwon-si, Gyeonsangnam-do (KR)

(72) Inventor: Chul Im, Gimhae-si (KR)

(73) Assignee: Doosan Heavy Industries Construction Co., Ltd., Gyeongsangnam-do (KR)

( * ) Notice: Subject to any disclaimer, the term of this patent is extended or adjusted under 35 U.S.C. 154(b) by 319 days.

(21) Appl. No.: 15/067,894

(22) Filed: Mar. 11, 2016

(65) Prior Publication Data
US 2017/0063181 A1 Mar. 2, 2017

(30) Foreign Application Priority Data

Sep. 2, 2015 (KR) .................. 10-2015-0124300

(51) Int. Cl.
*H02K 1/18* (2006.01)
*H02K 5/20* (2006.01)

(52) U.S. Cl.
CPC .............. *H02K 1/185* (2013.01); *H02K 5/20* (2013.01); *H02K 2213/12* (2013.01)

(58) Field of Classification Search
CPC ....... H02K 1/185; H02K 2213/12; H02K 5/20
USPC .......................................................... 310/51
See application file for complete search history.

(56) References Cited

U.S. PATENT DOCUMENTS

| 2,554,226 | A | 5/1951 | Taylor | |
|---|---|---|---|---|
| 4,425,523 | A | 1/1984 | Detinko et al. | |
| 6,498,417 | B2 * | 12/2002 | Fuller | H02K 1/185 310/216.113 |
| 7,994,691 | B2 * | 8/2011 | George | H02K 1/185 310/419 |
| 8,040,014 | B2 * | 10/2011 | Boardman, IV | H02K 1/185 310/216.129 |
| 8,319,405 | B2 * | 11/2012 | Allen | H02K 1/185 310/413 |
| 8,714,534 | B2 * | 5/2014 | Vitello | H02K 15/028 269/55 |

(Continued)

FOREIGN PATENT DOCUMENTS

| JP | 52-115304 A | 9/1977 |
|---|---|---|
| JP | 57-186937 A | 11/1982 |

(Continued)

OTHER PUBLICATIONS

Communication dated Feb. 28, 2017 from the Japanese Patent Office in counterpart application No. 2016-053056.

(Continued)

*Primary Examiner* — Alex W Mok
(74) *Attorney, Agent, or Firm* — Invenstone Patent, LLC

(57) ABSTRACT

A device for preventing a vibration of a stator core for power generator includes: a ring-shaped fastening band installed to enclose an outer circumferential surface of a stator core to support the stator core; a plurality of key bars coupled with the fastening band to be coupled with the stator core; and a plurality of elastic portions coupled with the fastening band to insulate vibrations in a diameter direction and an outer circumferential direction of the stator core, in which a diameter of the fastening band is extendible.

17 Claims, 4 Drawing Sheets

(56) References Cited

U.S. PATENT DOCUMENTS

| | | | |
|---|---|---|---|
| 8,813,333 B2* | 8/2014 | Vitello | H02K 15/0006 |
| | | | 29/402.08 |
| 8,829,760 B2* | 9/2014 | Tanavde | H02K 1/185 |
| | | | 310/216.113 |
| 8,860,287 B2* | 10/2014 | Longtin | H02K 1/146 |
| | | | 310/418 |
| 2009/0108704 A1 | 4/2009 | Thaler | |
| 2010/0244618 A1 | 9/2010 | Kikuichi | |
| 2011/0210643 A1 | 9/2011 | Tanavde et al. | |

FOREIGN PATENT DOCUMENTS

| | | |
|---|---|---|
| JP | 2000092756 A | 3/2000 |
| JP | 2002-204539 A | 7/2002 |
| JP | 2010-226900 A | 10/2010 |
| JP | 2010-273535 A | 12/2010 |
| JP | 2010-284074 A | 12/2010 |
| KR | 10-2010-0124671 A | 11/2010 |
| KR | 10-2011-0098640 A | 9/2011 |

OTHER PUBLICATIONS

Communication dated Nov. 16, 2016 issued by the European Patent Office in counterpart application No. 16165761.4.
Communication dated Nov. 18, 2016 issued by the Korean Patent Office in counterpart application No. 10-2015-0124300.

* cited by examiner

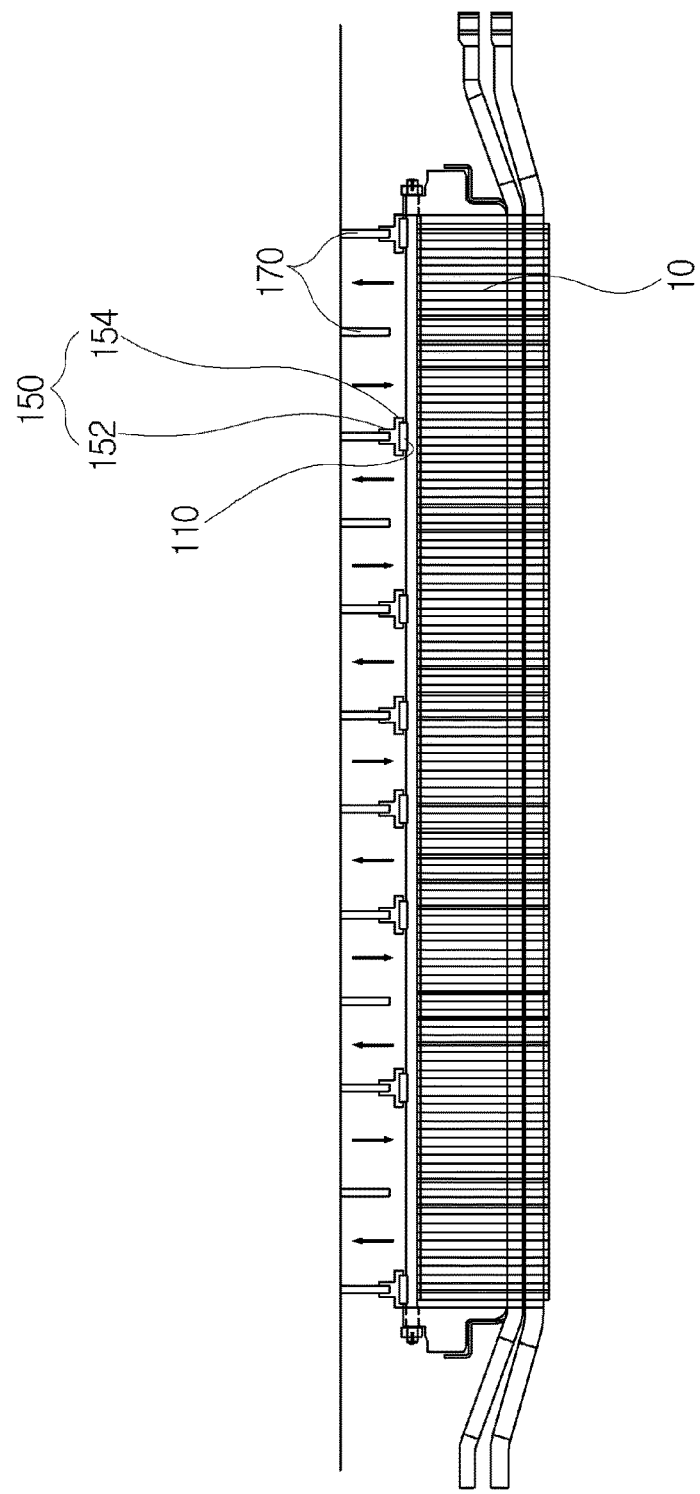

DEVICE FOR PREVENTING VIBRATION OF STATOR CORE FOR POWER GENERATOR

CROSS-REFERENCE TO RELATED APPLICATION

This application claims priority to Korean Patent Application No. 10-2015-124300, filed on Sep. 2, 2015, the disclosure of which is incorporated herein by reference in its entirety.

BACKGROUND

Field

Exemplary embodiments of the present disclosure relate to a device for preventing a vibration of a stator core for a power generator, and more particularly, to a device for preventing a vibration of a stator core for a power generator capable of actively coping with a change in a length and an outer diameter of a core.

Description of the Related Art

Generally, a power generator that is a device using an electronic induction action to convert mechanical energy into electrical energy is a device using a principle of generating power when a conductor performs a rotational motion within a magnetic field. The power generator uses hydrogen gas and water as a cooling medium and has a completely sealed structure to prevent penetration of dust or moisture and leakage of the hydrogen gas.

Ventilation in an inside of the power generator is made by a closed circulation scheme using a fan attached to a rotor shaft that is a rotor and the power generator has a cooler embedded therein to cool the hydrogen gas. Further, both ends of a stator are provided with a rotor bearing and a shaft sealing device.

The stator is largely divided into a frame forming an appearance, a stator coil, and a stator core around which the stator coil is wound. The stator core serves to support the stator coil while providing a low resistance path for a magnetic flux generated from the rotor.

A stator frame is a structure providing a space to properly function each component such as the stator core, the rotor, the cooler, and a high pressure bushing and serves as a frame of the power generator.

Among fixtures provided in the stator frame, key bars serve to support a stacked weight when the stator core and the core are stacked and have a structure as disclosed in Japanese Patent Laid-Open Publication No. 2002-204539. At the time of the installation of the key bars, the key bars are coupled with the stator core by a scheme of setting heights of the key bars using a surface plate and then coupling the key bars at a fixed position one by one using a crane.

The existing key bars are fixedly coupled at an inner side surface of the frame by a welding and is assembled in a structure in which it is stacked by inserting the stator core into the key bar. By the way, even though the key bar and the stator core adhere to each other, the key bar and the stator core are repeatedly attached to or detached from each other by a magnetic force generated upon the rotation of the rotor, and as a result, noise and vibrations may be large, or the like.

Further, the existing key bar has a round shape, and therefore if a length, an outer diameter, and tangent stiffness, and the like of the core are changed, there is a problem in that a device for preventing a vibration of a stator core for a power generator needs to be completely re-designed and the coupled structure thereof needs to be changed.

RELATED ART DOCUMENT

Patent Document

Japanese Patent Laid-Open Publication No. 2002-204539 (published on Jul. 19, 2002).

SUMMARY

An object of the present disclosure relates to a device for preventing a vibration of a stator core for a power generator capable of actively coping with a change in a length and an outer diameter of a core.

Other objects and advantages of the present disclosure can be understood by the following description, and become apparent with reference to the embodiments of the present disclosure. Also, it is obvious to those skilled in the art to which the disclosure pertains that the objects and advantages can be realized by the means as claimed and combinations thereof.

In accordance with one aspect of the present disclosure, a device for preventing a vibration of a stator core for a power generator includes: a ring-shaped fastening band installed to enclose an outer circumferential surface of a stator core to support the stator core; a plurality of key bars coupled with the fastening band to be coupled with the stator core; and a plurality of elastic portions coupled with the fastening band to insulate vibrations in a diameter direction and an outer circumferential direction of the stator core, in which a diameter of the fastening band is extendible.

The device may further include a plurality of support blocks movably coupled with the fastening band to be coupled with the key bar and the support blocks and the elastic portions may be alternatively disposed to each other.

The number of key bars and the number of elastic portions are changed depending on a length of the stator core.

The key bars may be installed to control an interval from adjacent key bars.

The elastic portions may be installed to control an interval from adjacent elastic portions.

The device may further include a plurality of section plates coupled with the elastic portions and the elastic portion may include a plate coupling portion coupled with an inner circumferential surface of the section plate and a band coupling portion coupled with an outer circumferential surface of the fastening band.

The elastic portion may be configured to change a length of the plate coupling portion depending on an outer diameter of the stator core.

The section plate may partition an introduction portion and a discharge portion through which air or hydrogen gas is introduced and discharged according to a ventilation structure of the stator core.

The elastic portions may be provided at the plurality of section plates, respectively.

The elastic portions may be selectively provided at the plurality of section plates.

In accordance with another aspect of the present disclosure, a device for preventing a vibration of a stator core for a power generator includes: a ring-shaped fastening band having a diameter changed depending on a diameter of the stator core and coupled with an outer circumferential surface of the stator core to support the stator core; a plurality of key bars coupled with the fastening band to be coupled with the stator core; and a plurality of elastic portions coupled with the fastening band to insulate vibrations in a diameter direction and an outer circumferential direction of the stator core, in which an interval between the key bar and the elastic portion may be changed depending on a length of the stator core.

If an outer diameter of the stator core is larger than a reference outer diameter, a length of the elastic portion may be short depending on an extension of the fastening band.

The key bars and the elastic portions may be alternatively disposed to each other and the number of key bars and the number of elastic portions may be changed depending on the length of the stator core.

If the length of the stator core is increased, the number of key bars and the number of elastic portions may be increased.

If the length of the stator core is decreased, the number of key bars and the number of elastic portions may be decreased.

The device may be disposed at an outside of the fastening band and further include a plurality of section plates coupled with the elastic portions.

The section plate may partition an introduction portion and a discharge portion through which air or hydrogen gas is introduced and discharged according to a ventilation structure of the stator core and the elastic portions may be selectively provided at some or all of the section plates.

According to the exemplary embodiments of the present disclosure, even though the length and the outer diameter of the core are changed, the device for preventing a vibration of a stator core for a power generator may be applied to the changed structure, such that the power generator having various capacities may be designed while maintaining the structural stability without being newly designed and changing the coupled structure.

Further, the device for preventing a vibration of a stator core for a power generator may control both of vibrations in a diameter direction and vibrations in a tangent direction of the stator core, thereby securing the higher dynamic stability.

It is to be understood that both the foregoing general description and the following detailed description are exemplary and explanatory and are intended to provide further explanation of the invention as claimed.

BRIEF DESCRIPTION OF THE DRAWINGS

The above and other objects, features and other advantages of the present disclosure will be more clearly understood from the following detailed description taken in conjunction with the accompanying drawings, in which:

FIG. 4 is a diagram illustrating another installation example of the device for preventing a vibration of a stator core for a power generator.

DESCRIPTION OF SPECIFIC EMBODIMENTS

Hereinafter, a device for preventing a vibration of a stator core for a power generator according to an exemplary embodiment of the present disclosure will be described in detail with reference to the accompanying drawings.

Figure 1:
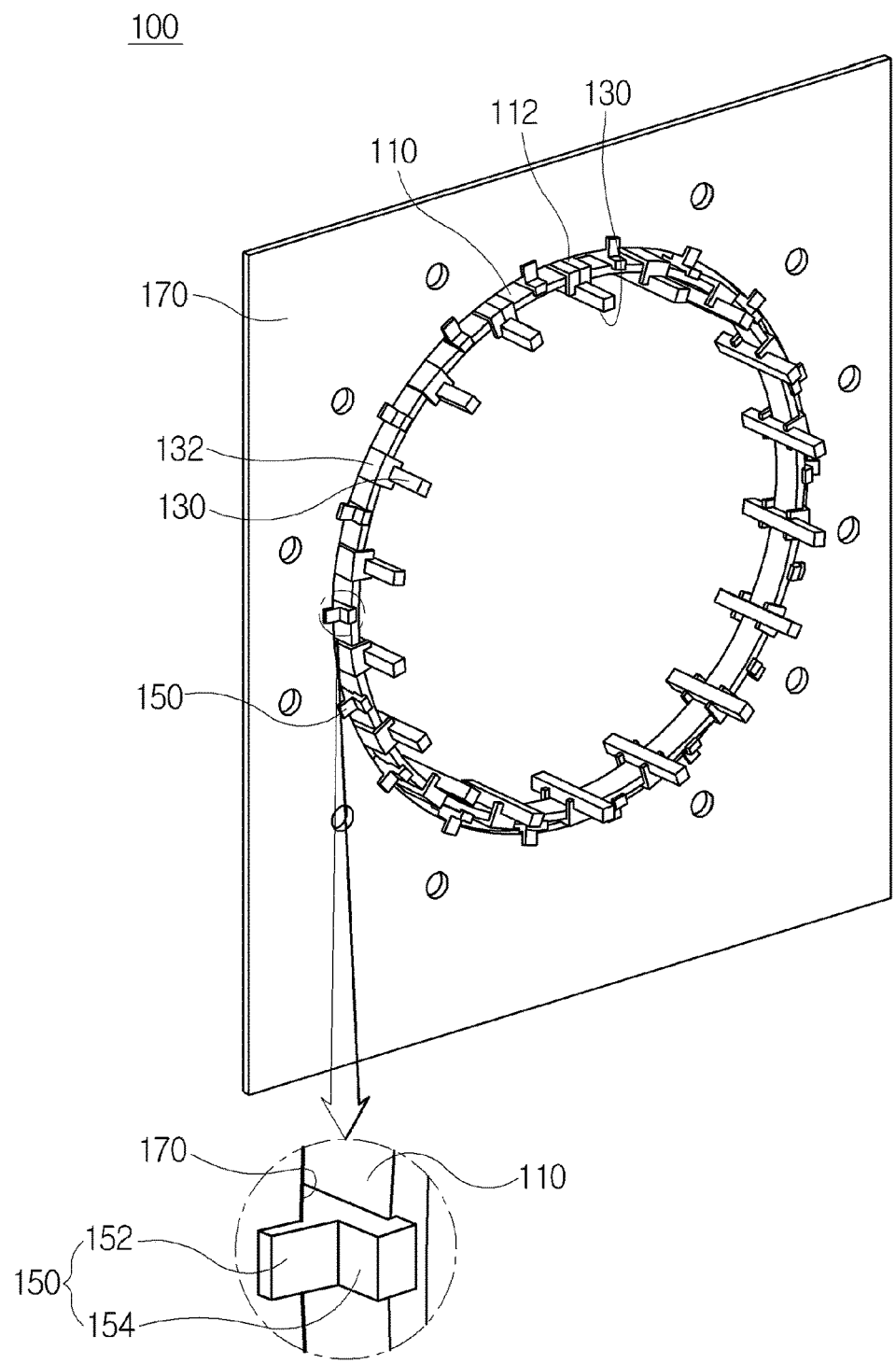
FIG. 1 is a perspective view illustrating a device for preventing a vibration of a stator core for a power generator according to an exemplary embodiment of the present disclosure.
Figure 2:
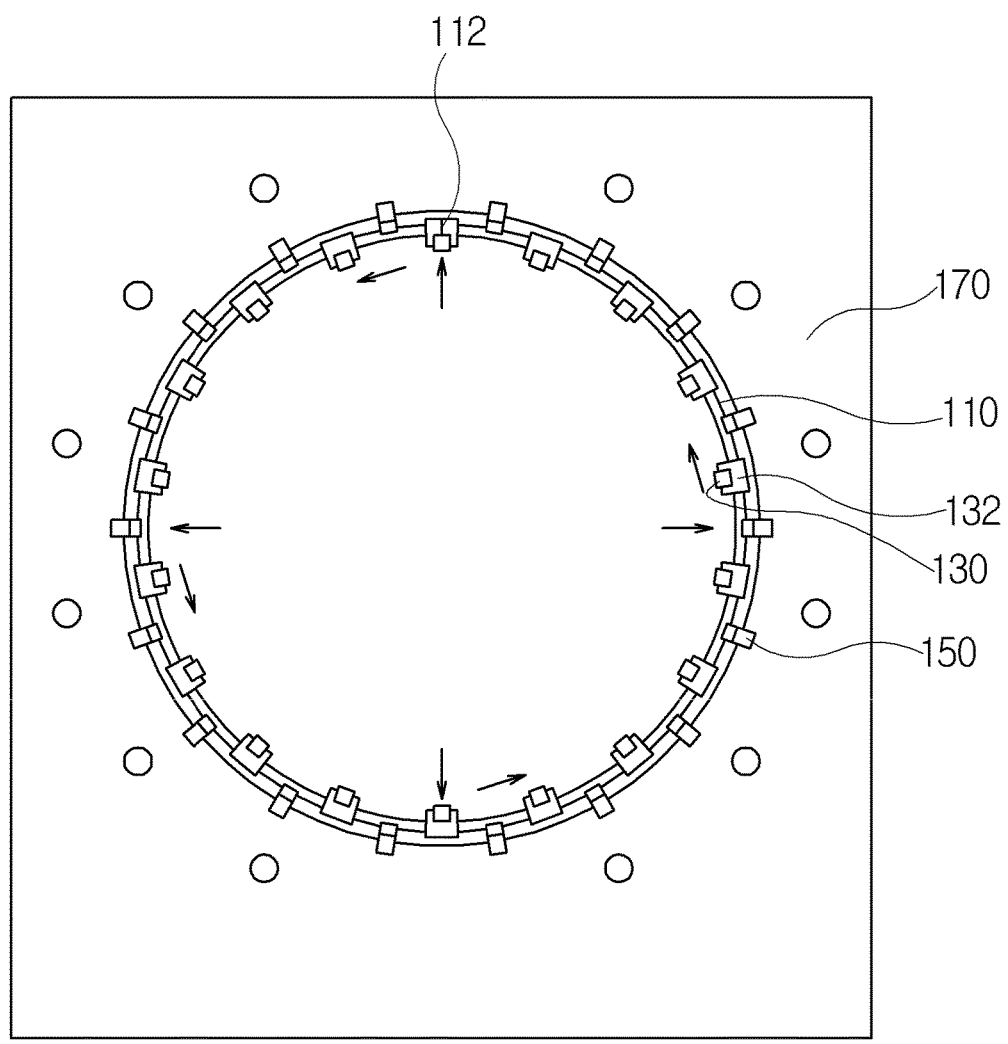
FIG. 2 is a front view of the device for preventing a vibration of a stator core for a power generator illustrated in FIG. 1.

FIG. 1 is a perspective view illustrating a device for preventing a vibration of a stator core for a power generator according to an exemplary embodiment of the present disclosure and FIG. 2 is a front view of the device for preventing a vibration of a stator core for a power generator illustrated in FIG. 1.

A stator includes a stator frame forming an appearance, a stator core 10, and a coil winding portion, in which the stator coil is wound around the coil winding portion.

The stator core 10 is configured to include punching, an inside space block (ISSB), and an outside space block (OSSB). The punching provides a low resistance path for a magnetic flux and the internal space block serves as a circulation path of hydrogen gas that is a refrigerant. The outside space block delivers a clamping pressure of a flange and serves as a circulation path of the hydrogen gas.

Generally, a magnetic force generated by a rotation of a rotor generates vibrations in the stator core 10. The exemplary embodiment of the present disclosure provides the device for preventing a vibration of a stator core for a power generator that may be applied without changing a structure even though a length and an outer diameter of a core are changed, while decreasing the vibration of the stator core 10.

As illustrated in FIGS. 1 and 2, a device 100 for preventing a vibration of a stator core for a power generator according to an exemplary embodiment of the present disclosure is a ring-shaped band having a predetermined width.

The device 100 for preventing a vibration is configured to include a ring-shape fastening band 110 installed to enclose the stator core 10 (see FIG. 3) along a circumferential direction at an outer circumferential surface of the stator core 10 and connecting portions 112 connecting the fastening band 110. An inner circumferential surface of the fastening band 110 is integrally provided with a plurality of key bars 130 and an outer circumferential surface of the fastening band 110 is coupled with a plurality of elastic portions 150. Section plates 170 are provided to be spaced apart from the outer circumferential surface of the fastening band 110 at a predetermined interval.

The fastening band 110 has a shape in which one side of the ring shape is separated and the separated parts are fixedly connected to each other by the connecting portions 112 to become a ring shape. The connecting portion 112 has a block shape into which the separated end portions of the fastening band 110 are each inserted and may be formed in the same shape as support blocks 132 supporting the key bars 130. The connecting portions 112 and the separated end portions of the fastening band 110 that are coupled with each other are fixed by interconnecting to each other by the fastening bolt, and then the connecting portions 112 are coupled with the key bars 130.

The plurality of key bars 130 are provided on an inner circumferential surface of the fastening band 110 and are coupled with the support block 132 by welding, or the like. The key bar 130 has a bar shape having a width smaller than that of the fastening band 110 and a part coupled with the support block 132 may have a cross section having a circular shape, a quadrangular shape, a dove tail shape, or the like. A part exposed from the support block 132 to be toward the stator core 10 may have a cross section having a circular shape, a quadrangular shape, a dove tail shape, or the like.

The support block 132 has a tetrahedral block shape and is provided with a hollow, such that the fastening band 110 penetrates through the hollow and is thus inserted into the fastening band 110. Therefore, the support block 132 may move along an outer circumferential direction of the fastening band 110. The support block 132 may be installed to control a distance from other adjacent support blocks 132 and the elastic portions 150 are disposed between the respective support blocks 132.

The elastic portion 150 is configured to include a plate coupling portion 152 coupled with an inner circumferential surface of the section plate 170 and a band coupling portion 154 coupled with the outer circumferential surface of the fastening band 110. The elastic portion 150 and the support block 132 are alternately disposed to each other. Similar to the support block 132, the elastic portion 150 may be movably coupled to control a distance from the adjacent elastic portions 150 or an interval from the adjacent support blocks 132.

The plate coupling portion 152 is provided with a 'ㄷ'-letter groove corresponding to the width of the section plate 170 and the groove is press-fitted in the inner circumferential surface of the section plate 170 to be coupled with the section plate 170. The plate coupling portion 152 may couple the groove with the section plate 170 by a press-fit scheme and may have a shape like tongs to be detachably coupled with the section plate 170.

Although not illustrated in detail, a length of the plate coupling portion 152 may be changed. The length of the plate coupling portion 152 means a length corresponding to a diameter direction of the stator core 10 and the length of the plate coupling portion 152 may be changed to cope with the change in the outer diameter of the stator core 10. A method for changing the length of the plate coupling portion 152 may be variously applied and therefore is not particularly limited to any one example.

For example, a structure for supporting a stator core having a diameter of 93 inches and a structure for supporting a stator core having a diameter of 94 inches are designed to be completely different from each other, but the fastening band 110 according to the device 100 for preventing a vibration of the present disclosure may support the stator core having a diameter of 92 to 95 inches on the same design condition.

The band coupling portion 154 is provided with a 'ㄷ'-letter groove corresponding to a width of the fastening band 110 and the outer circumferential surface of the fastening band 110 is press-fitted in the groove to couple between the band coupling portion 154 and the fastening band 110. The band coupling portion 154 may couple the groove with the fastening band 110 by the press-fit scheme and may have a shape like tongs to be detachably coupled with the fastening band 110.

If the diameter of the stator core 10 is increased due to the foregoing structure and thus the outer diameter of the stator core 10 is increased, a length of the elastic portion 150 is adjusted to correspond to the increase in the outer diameter of the stator core 10. Further, when the length of the stator core 10 is increased, the number of elastic portions 150 is increased to cope with the change in the length of the stator core 10.

As illustrated in FIG. 2, the stator core 10 may radially be vibrated along the diameter direction and may be vibrated even along the tangent direction of the outer circumferential surface. However, the elastic portion 150 of the device 100 for preventing a vibration supports the fastening band 110 supporting the stator core 10 and the section plate 170 while the fastening band 110 and the section plate 170 being spaced apart from each other and therefore may cope with the vibration generated in the diameter direction of the stator core 10.

Further, the plurality of elastic portions 150 support the fastening band 110 and therefore may also cope with the vibration generated along the tangent direction of the outer circumferential surface. Therefore, it is possible to achieve higher dynamic stability upon the installation of the stator core.

The installation example of the device for preventing a vibration of a stator core for a power generator according to the exemplary embodiment of the present disclosure having the foregoing configuration will be described below.

Figure 3:
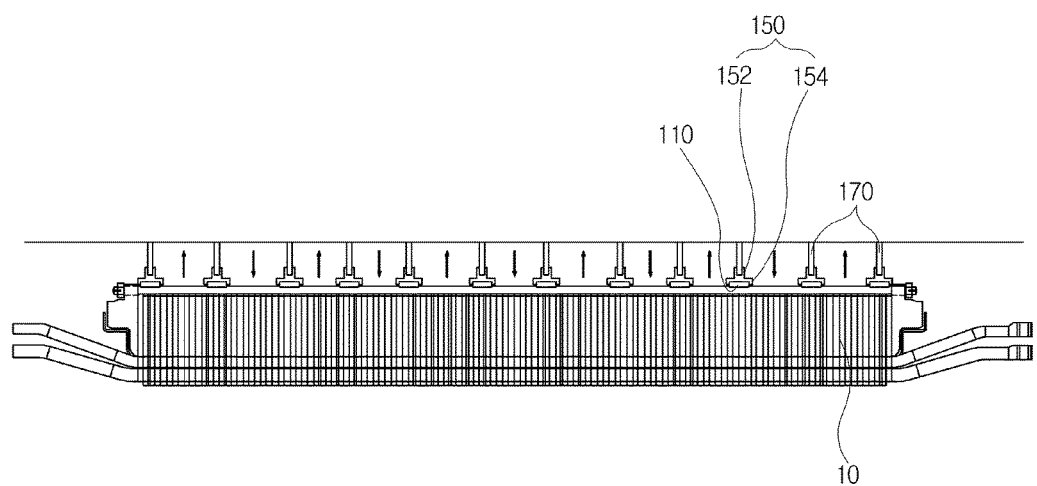
FIG. 3 is a diagram illustrating an installation example of the device for preventing a vibration of a stator core for a power generator according to the exemplary embodiment of the present disclosure.

FIG. 3 is a diagram illustrating an installation example of the device for preventing a vibration of a stator core for a power generator according to the exemplary embodiment of the present disclosure and FIG. 4 is a diagram illustrating another installation example of the device for preventing a vibration of a stator core for a power generator.

The section plate 170 partitions an introduction portion and a discharge portion through which hydrogen gas is introduced and discharged corresponding to a ventilation structure of the stator core 10. In this case, as illustrated in FIG. 3, the coupled structure in which all the section plates 170 are provided with the elastic portions 150 may be applied. When the corresponding structure is applied to all the section plates 170, all the section plates 170 are coupled to the stator core 10 by the coupled structure between the elastic portions 150 and the fastening band 110.

Alternatively, as illustrated in FIG. 4, according to the design, some of the section plates 170 are coupled with the elastic portions 150 and some of the section plates 170 are not coupled with the elastic portions 150. In this case, some of the section plates 170 are not connected to the stator core 10 and only the remaining section plates 170 are connected to the stator core 10.

Although the structure in which the elastic portion 150 is coupled with all the section plates 170 is not applied, the vibration insulating function may be sufficient and therefore some of the section plates 170 may be configured to have the simple structure. It is possible to improve the manufacturing performance and secure the price competitiveness by the simplification of the structure.

The various exemplary embodiments of the present disclosure, which is described as above and shown in the drawings, should not be interpreted as limiting the technical spirit of the present disclosure. The scope of the present invention is limited only by matters set forth in the claims and those skilled in the art can modify and change the technical subjects of the present invention in various forms. Therefore, as long as these improvements and changes are apparent to those skilled in the art, they are included in the protective scope of the present invention.

What is claimed is:

1. A device configured to prevent a vibration of a stator core for a power generator, comprising:
 a ring-shaped fastening band to enclose an outer circumferential surface of a stator core to support the stator core;
 a plurality of key bars coupled with the fastening band to be coupled with the stator core; and
 a plurality of elastic portions press-fit with an outer circumferential surface of the fastening band to insulate vibrations in a diameter direction and an outer circumferential direction of the stator core, each one of the elastic portions to be press-fit with an inner circumferential surface of a single one of a plurality of section plates, respectively, wherein a diameter of the fastening band is extendible.

2. The device of claim 1, further comprising:
a plurality of support blocks movably coupled with the fastening band to be coupled with the plurality of key bars.

3. The device of claim 2, wherein the support blocks and the elastic portions are alternatively disposed with respect to each other along a circumferential direction of the fastening band.

4. The device of claim 3, wherein the number of key bars and the number of elastic portions are changed depending on a length of the stator core.

5. The device of claim 3, wherein the key bars are installed to control an interval from adjacent key bars.

6. The device of claim 3, wherein the elastic portions are installed to control an interval from adjacent elastic portions.

7. The device of claim 1, wherein each one of the plurality of elastic portions includes:
a plate coupling portion having a groove into which the inner circumferential surface of the respective one of the section plates is press-fitted, and
a band coupling portion having a groove into which the outer circumferential surface of the fastening band is press-fitted.

8. The device of claim 7, wherein the elastic portion is configured to change a length of the plate coupling portion depending on an outer diameter of the stator core.

9. The device of claim 7, wherein the section plate partitions an introduction portion and a discharge portion through which air or hydrogen gas is introduced and discharged according to a ventilation structure of the stator core.

10. The device of claim 9, wherein the elastic portions are selectively provided at some of the plurality of section plates.

11. A device configured to prevent a vibration of a stator core for a power generator, comprising:
a ring-shaped fastening band having a diameter configured to be changed depending on a diameter of the stator core, the ring-shaped fastening band configured to be coupled with an outer circumferential surface of the stator core to support the stator core;
a plurality of key bars coupled with an inner circumferential surface of the fastening band to be coupled with the stator core; and
a plurality of elastic portions press-fit with an outer circumferential surface of the fastening band to insulate vibrations in a diameter direction and an outer circumferential direction of the stator core, each one of the elastic portions to be press-fit with an inner circumferential surface of a single one of a plurality of section plates, respectively,
wherein an interval between the key bar and the elastic portion is configured to be changed depending on a length of the stator core.

12. The device of claim 11, wherein based upon an outer diameter of the stator core being larger than a predetermined reference outer diameter, a length of the elastic portion is shortened depending on an extension of the fastening band.

13. The device of claim 11, wherein the key bars and the elastic portions are alternatively disposed to each other and the number of key bars and the number of elastic portions are changed depending on the length of the stator core.

14. The device of claim 13, wherein as the length of the stator core is increased, the number of key bars and the number of elastic portions are increased.

15. The device of claim 13, wherein as the length of the stator core is decreased, the number of key bars and the number of elastic portions are decreased.

16. The device of claim 11, wherein the section plates each partition an introduction portion and a discharge portion through which air or hydrogen gas is introduced and discharged according to a ventilation structure of the stator core, and the elastic portions are selectively provided at some or all of the section plates.

17. The device of claim 11, wherein each one of the plurality of elastic portions includes:
a plate coupling portion having a groove into which the inner circumferential surface of the respective one of the section plates is press-fitted, and
a band coupling portion having a groove into which the outer circumferential surface of the fastening band is press-fitted.

* * * * *